Aug. 20, 1929.  C. DEGENHART ET AL  1,725,343
AUXILIARY HANDLE FOR LEVERS OF MOTOR VEHICLES
Filed March 8, 1929
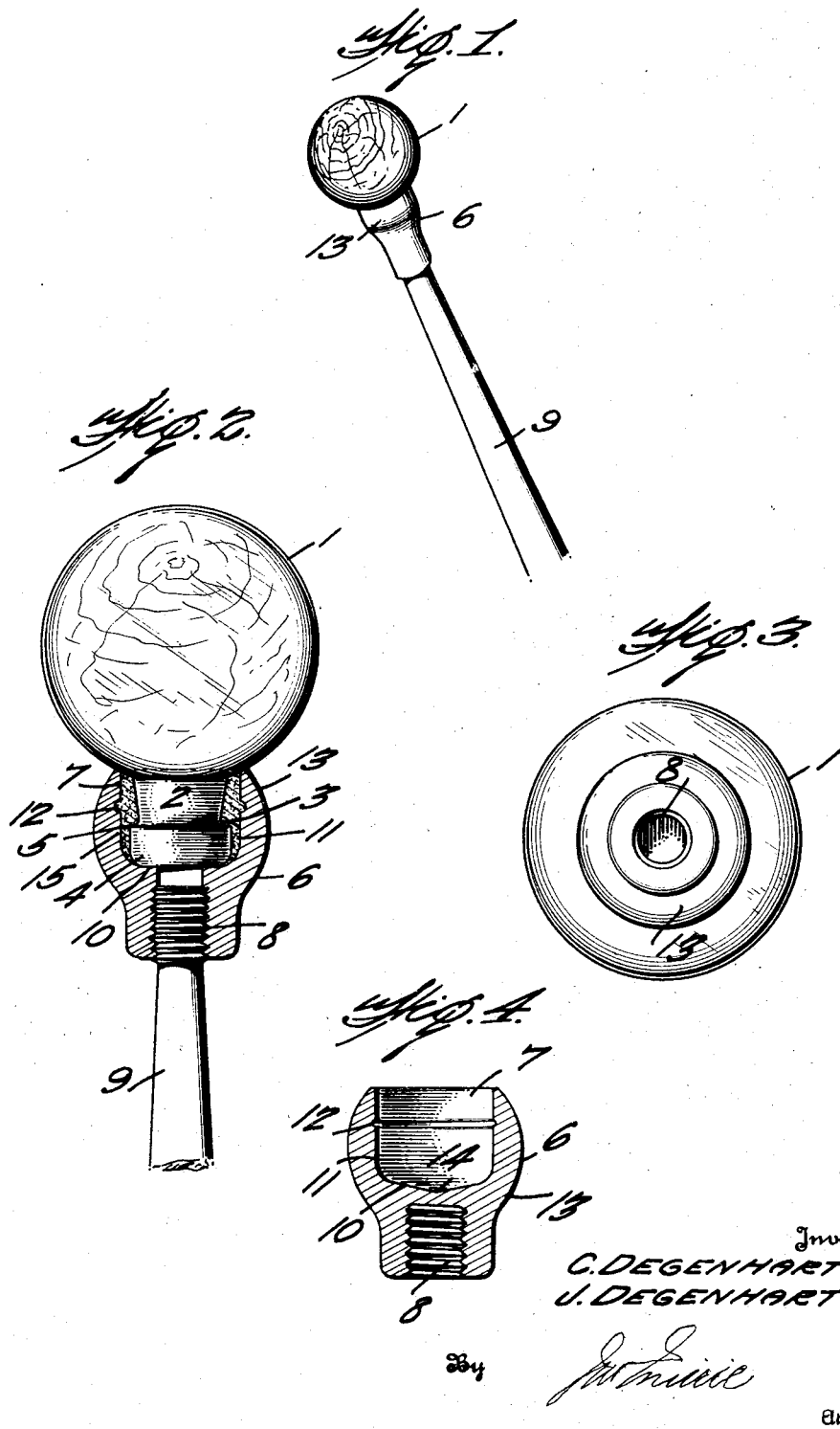
Inventors
C. DEGENHART
U. DEGENHART
By
Attorney Patented Aug. 20, 1929.

1,725,343

UNITED STATES PATENT OFFICE.

CHARLES DEGENHART AND JOHN DEGENHART, OF CAMBRIDGE, OHIO.

AUXILIARY HANDLE FOR LEVERS OF MOTOR VEHICLES.

Continuation of application Serial No. 252,398, filed February 6, 1928. This application filed March 8, 1929. Serial No. 345,356.

This invention is directed to an improvement in auxiliary handles for the controlling levers, particularly of motor vehicles, the present application being a continuation of our application filed February 6, 1928, Serial No. 252,398.

The controlling levers of motor vehicles, particularly the gear shifting lever, is usually provided with a straight metallic handle, and an accessory in the shape of an auxiliary handle designed for more convenient gripping as well as a more ornamental appearance has long been on the market. It is customary to mount these auxiliary handles for threaded cooperation with the lever, and as such auxiliary handles not infrequently include a glass or composite knob, it is apparent that a metallic connector must be provided which is designed for threaded cooperation with the lever, and also adapted for rigid connection with the knob or handle proper.

The main object of the present invention is the provision of a connector of this type formed at one end for threaded cooperation with the lever, and at the opposite end to receive a projecting portion of the knob or handle proper.

The present invention therefore has for its principal object the provision of a metallic connector formed at one end for cooperation with the lever, and at the opposite end for the reception of a knob from the handle proper, whereby the connector may be secured as a rigid substantially integral element with the handle proper.

The invention is illustrated in the accompanying drawings, in which:

Figure 1 is a perspective view showing a portion of the lever with the improved handle connected therewith.

Figure 2 is an enlarged broken elevation of the same, the metallic connector being shown in vertical section.

Figure 3 is a bottom plan view of the handle proper.

Figure 4 is a view in section of another form of the connector.

The handle proper comprises a member 1, preferably though not necessarily of cylindrical form, and designed to be constructed of any material. In this connection, it is contemplated that the handle proper be constructed for example of glass of solid form, interiorly decorated in any desired manner, that is to say, the interior of the glass handle may contain various ornamentations, such for example as the insignia of any society, an initial, or any other desired configuration.

Projecting from the handle proper is a knob 2 of particular form. The knob is cylindrical in any transverse section and exteriorly converges from its juncture with the handle proper for a short distance as at 3, and terminates in a circular section 4 of normal diameter, which at its juncture with the converging portion presents a shoulder 5.

The connector 6 is in the form of a metallic member, having a recess 7 at one end to receive the knob 2, and formed at its opposite end with an interior threaded aperture 8 to receive the end of the lever 9. The recess 7 is an enlarged continuation of the threaded bore 8, and presents an abrupt shoulder 10 to receive the end of the enlargement 4 of the knob. Beyond the shoulder 10, the wall 11 of the recess extends substantially parallel to the axis of the connector, having a diameter however exceeding the similar dimension of the knob at all points lengthwise the recess. The wall 11 at a point approximately midlength is formed on the inner side with an annular channel 12, this channel being located above the shoulder 5 of the knob when the parts are assembled.

The exterior surface of the connector throughout that length including the recess 7, is rounded as at 13, so that the upper edge of the recess presents a single line of juncture between the wall 11 and the outer rounded contour of the connector.

The form shown in Figure 4 is identical with the form described, except that a partition wall 14 divides the recess 7 and aperture 8 to prevent the cementitious material from entering the aperture 8 and interfering with the application or removal of the lever 9.

When applying the connector to the handle proper, an appreciable quantity of cement as 15 is placed in the recess 7 and the latter forced over the knob 2. As the recess 7 at its lower end is substantially the same as the exterior diameter of the knob at this end, the connector readily centers itself with respect to the knob, and when the cement or other like material sets, it will securely hold the knob and connector together. As evident from Figure 2 of the drawings, the body of cement overlies the shoulder 5, and throughout the converging portion of the knob closely grips the knob above the shoulder. The cement body also forms an interlocking outstanding rib by seating in the channel 12, so that separation of the knob and connector is prevented through the interlocking of the cement body with the connector at the channel 12, and through the interlocking of the cement body with the knob of the shoulder 5 and throughout the converging portion 3.

Obviously, the threaded bore 8 is of a size and thread formation to cooperate with the particular lever with which it may be designed, and in this connection, where the auxiliary handle may be designed for levers having a threaded bore, the connector 6 may, in lieu of the threaded bore 8, be formed with an exteriorly threaded projecting stem to cooperate with such threaded bore in the lever. This detail is a conventional one and requires no illustration, it being understood that the lever engaging end of the connector is to be formed in any appropriate manner to cooperate with a particular lever.

The invention is particularly concerned with the connector 6 and the means for joining it to the handle proper through the provision of the knob 2 and the cementitious material, and it will be obvious from the construction described that when the parts are properly connected as described, the connector becomes a substantially rigid and integral portion of the handle proper.

With the recess 7 and aperture 8 divided by the wall 14, there is no possibility of the cement entering the aperture 8 to interfere with the application or removal of the device. Furthermore, by the use of this wall, the cement receiving recess may be casually filled with the cement without particular care, and the knob of the handle proper forced into the cement-filled or partly filled recess to secure the parts.

What is claimed to be new is:

1. An auxiliary handle for levers of motor vehicles, including a handle proper and a connector forming part of said handle and formed at one end for removable connection with the lever, said connector being formed with a recess having a portion between its ends of greater diameter than that of its ends, the handle proper having a knob formed with a shoulder portion to fit within the recess beyond the portion of greatest diameter, and cementitious material overlying the shoulder of the knob and filling the portion of greatest diameter of the recess above the knob to secure the handle proper and connector together.

2. An auxiliary handle for the levers of motor vehicles, including an ornamental handle proper having a knob projecting therefrom, said knob converging from the handle and terminating in a cylindrical portion forming a shoulder with the terminal of the converging portion, and a connector formed in the recess to receive the knob, the diameter of the recess exceeding that of the converging portion of the knob, and the wall of the recess being formed with an annular channel between the handle proper and the shoulder on the knob, and cementitious material in the recess of the connector and gripping the converging portion of the knob and seating in the annular channel of the recess to hold the knob and connector together.

3. An auxiliary handle for motor vehicle levers, including an ornamental handle proper having a projecting knob formed in part with a converging portion and a terminal cylindrical member forming the shoulder with the converging portion, and a metallic connector adapted for removable connection with the lever and formed with a recess to receive the knob, one end of the recess cooperating with the cylindrical portion of the knob to center the knob and connector in application, the recess in the connector being otherwise of greater diameter than the knob and formed with an annular channel between the handle proper and the cylindrical portion of the knob, and a cementitious filling in said recess to overlie the shoulder of the knob and grip the converging portion thereof, said cementitious filling forming interlock with the connector through the annular channel in the wall of the recess of the latter.

4. An auxiliary handle for levers of motor vehicles, including a handle proper and a connector forming part of said handle and formed at one end for removable connection with the lever, said connector being formed with a recess having a portion between its ends of greater diameter than that of its ends, the connector including a transverse wall forming the bottom of the recess, the handle proper having a knob formed with a shoulder portion to fit within the recess beyond the portion of greatest diameter, and cementitious material overlying the shoulder of the knob and filling the portion of greatest diameter of the recess above the knob to secure the handle proper and connector together.

In testimony whereof we affix our signatures.

CHARLES DEGENHART.
JOHN DEGENHART.